US010928496B2

(12) United States Patent
Iizuka et al.

(10) Patent No.: US 10,928,496 B2
(45) Date of Patent: Feb. 23, 2021

(54) SENSOR AND METHOD FOR ESTIMATING POSITION OF LIVING BODY

(71) Applicant: Panasonic Intellectual Property Management Co., Ltd., Osaka (JP)

(72) Inventors: Shoichi Iizuka, Osaka (JP); Takeshi Nakayama, Hyogo (JP); Naoki Honma, Iwate (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 158 days.

(21) Appl. No.: 15/851,864

(22) Filed: Dec. 22, 2017

(65) Prior Publication Data

US 2018/0196131 A1  Jul. 12, 2018

(30) Foreign Application Priority Data

Jan. 6, 2017 (JP) .............................. JP2017-001120
Sep. 19, 2017 (JP) .............................. JP2017-179355

(51) Int. Cl.
 *G01S 13/00* (2006.01)
 *G01S 13/87* (2006.01)
 (Continued)

(52) U.S. Cl.
 CPC ............ *G01S 13/003* (2013.01); *G01S 7/414* (2013.01); *G01S 7/415* (2013.01); *G01S 13/878* (2013.01); *G01S 13/0209* (2013.01)

(58) Field of Classification Search
 CPC ........ G01S 13/003; G01S 7/415; G01S 7/414; G01S 13/878; G01S 13/0209; G01S 5/04
 (Continued)

(56) References Cited

U.S. PATENT DOCUMENTS

| 5,790,032 A * | 8/1998 | Schmidt | A61B 5/0507 340/573.4 |
| 6,784,826 B2 * | 8/2004 | Kane | A61B 5/1038 342/118 |

(Continued)

FOREIGN PATENT DOCUMENTS

| JP | 2007-155490 | 6/2007 |
| JP | 2007-518968 | 7/2007 |

(Continued)

OTHER PUBLICATIONS

Takashi Miwa, et al., "Localization of Living-bodies using single-frequency multistatic Doppler radar system", IEICE Transactions on Communications, vol. E92-B, No. 7, Jul. 1, 2009, pp. 2468-2476.

*Primary Examiner* — Frank J McGue
(74) *Attorney, Agent, or Firm* — Greenblum & Bernstein, P.L.C.

(57) ABSTRACT

A sensor includes at least one transmitting station including a transmission antenna; a plurality of receiving stations each including a reception array antenna; a first circuit that extracts, from signals observed by the reception array antenna of each of the plurality of receiving stations, living-body components, which are signal components transmitted from the transmission antenna and reflected by at least one living body; a second circuit that calculates, from the extracted living-body components, a plurality of position spectral functions, which are evaluation functions for evaluating a position of the at least one living body when viewed from the plurality of respective receiving stations; and a third circuit that integrates the plurality of calculated position spectral functions into one position spectral function, and calculates at least one maximum value of the position spectral function obtained as a result of integration to estimate the position of the at least one living body.

8 Claims, 11 Drawing Sheets

(51) Int. Cl.
  *G01S 7/41* (2006.01)
  *G01S 13/02* (2006.01)
(58) Field of Classification Search
  USPC .......................................................... 342/125
  See application file for complete search history.

(56) References Cited

U.S. PATENT DOCUMENTS

| | | | |
|---|---|---|---|
| 2007/0030115 A1* | 2/2007 | Itsuji .................... | A61B 5/1171 |
| | | | 340/5.8 |
| 2008/0204322 A1 | 8/2008 | Oswald et al. | |
| 2012/0162012 A1 | 6/2012 | Marzouki et al. | |
| 2015/0054670 A1* | 2/2015 | Wang .................. | G01S 13/0209 |
| | | | 342/21 |

FOREIGN PATENT DOCUMENTS

| | | |
|---|---|---|
| JP | 2010-032442 | 2/2010 |
| JP | 2010-249712 | 11/2010 |
| JP | 2012-524898 | 10/2012 |
| JP | 2015-117972 | 6/2015 |

* cited by examiner

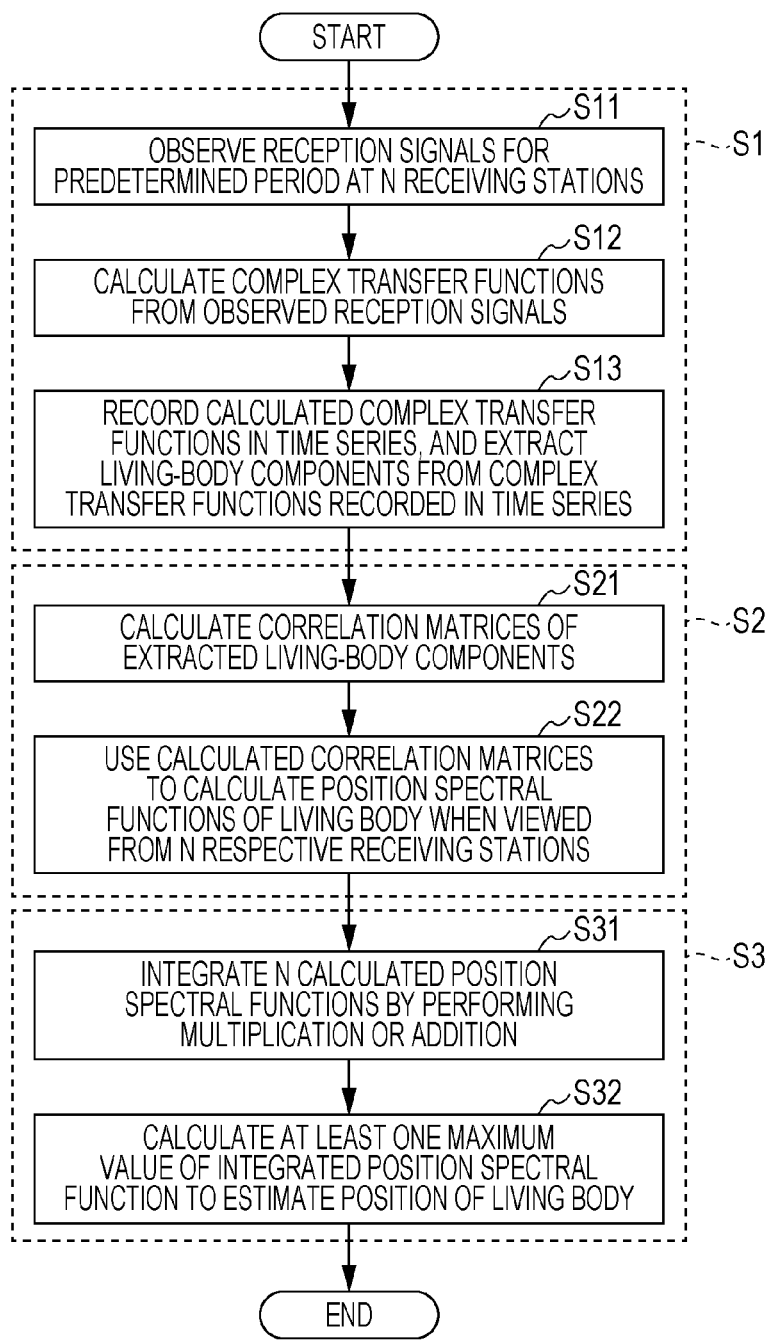

SENSOR AND METHOD FOR ESTIMATING POSITION OF LIVING BODY

BACKGROUND

1. Technical Field

The present disclosure relates to a sensor and a method for estimating the position of a living body. In particular, the present disclosure relates to a sensor for estimating the position of a living body and a method for estimating the position of a living body by using radio signals.

2. Description of the Related Art

Techniques for detecting a detection target by using signals that are wirelessly transmitted have been developed (see, for example, Japanese Unexamined Patent Application Publication No. 2015-117972 (hereinafter referred to as PTL 1) and T. MIWA, S. OGIWARA, and Y. YAMAKOSHI, "Localization of Living-bodies using single-frequency multistatic Doppler radar system", IEICE Transactions on Communications, Vol. E92-B, No. 7, pp. 20468-2476, July 2009 (hereinafter referred to as NPL 1)).

PTL 1 discloses a technique with which the position and state of a person, which is a detection target, can be known by using a Fourier transform and analyzing a component that includes a Doppler shift. NPL 1 discloses a technique for estimating the position of a detection target by using a fluctuating component extracted from propagation channel information and using the MUltiple SIgnal Classification (MUSIC) method.

However, the techniques disclosed by PTL 1 and NPL 1 have shortcomings in that, in a case where, for example, a living body, which is a detection target, stands still, the area for which the living body can be detected, that is, the detection area, is narrow.

SUMMARY

In one general aspect, the techniques disclosed here feature a sensor that includes at least one transmitting station, a plurality of receiving stations, a first circuit, a second circuit, and a third circuit. The at least one transmitting station includes a transmission antenna. The plurality of receiving stations each include a reception array antenna. The first circuit extracts, from signals observed by the reception array antenna of each of the plurality of receiving stations, living-body components, which are signal components transmitted from the transmission antenna and reflected by at least one living body. The second circuit calculates, from the living-body components extracted by the first circuit, a plurality of position spectral functions, which are evaluation functions for evaluating a position of the at least one living body when viewed from the plurality of respective receiving stations. The third circuit integrates the plurality of position spectral functions calculated by the second circuit into one position spectral function, and calculates at least one maximum value of the position spectral function obtained as a result of integration to estimate the position of the at least one living body.

With the sensor according to the present disclosure, it is possible to estimate the position at which a living body is present for a wider area with higher accuracy by using radio signals.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 is a flowchart illustrating the details of the position estimation process illustrated in FIG. 3;

DETAILED DESCRIPTION

Figure 1:
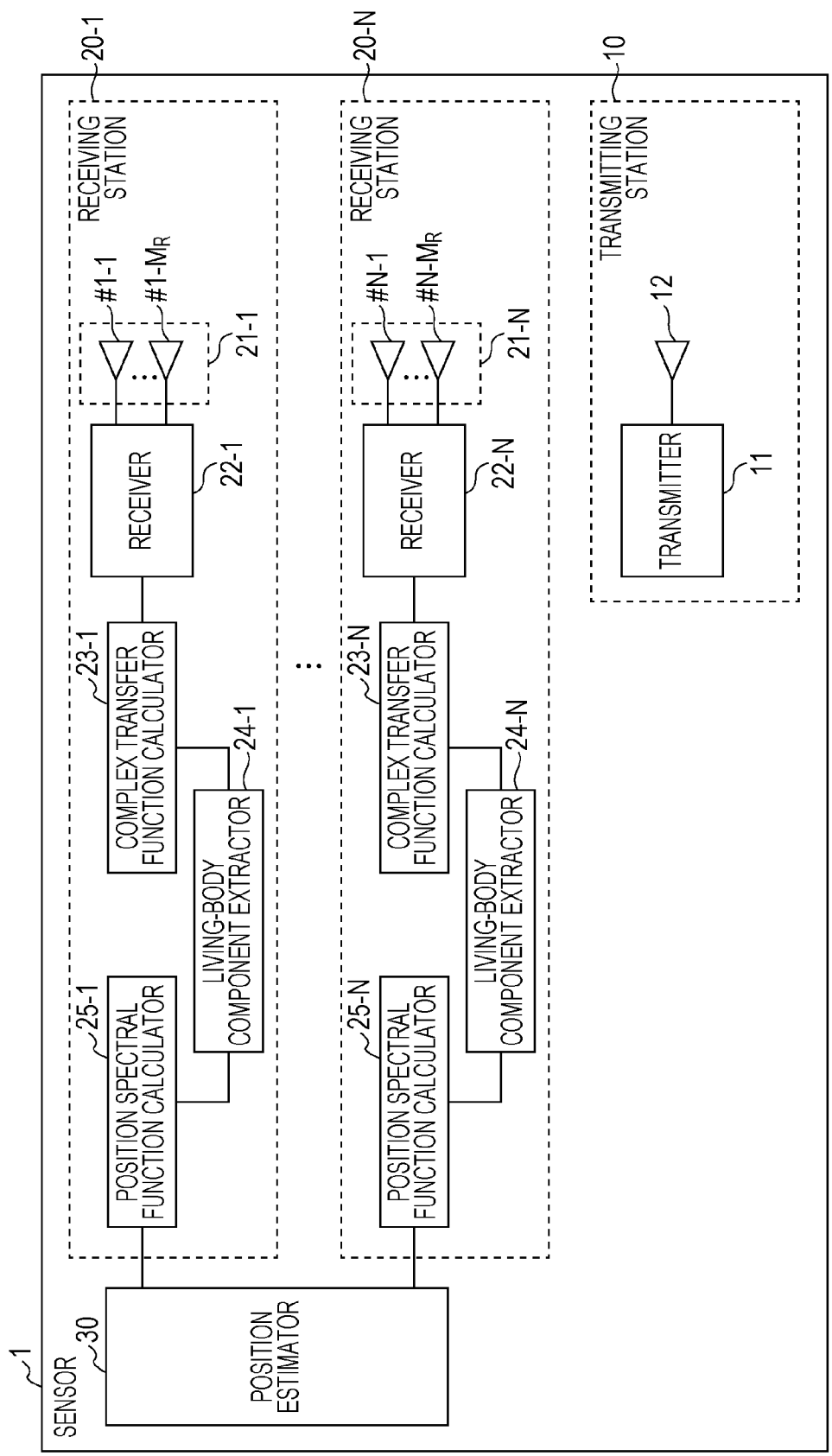
FIG. 1 is a block diagram illustrating a configuration of a sensor according to a first embodiment.

Underlying Knowledge Forming Basis of the Present Disclosure

Techniques for detecting a detection target by using signals that are wirelessly transmitted have been developed (see, for example, PTL 1, NPL 1, Japanese Unexamined Patent Application Publication Nos. 2010-249712, 2007-155490, and 2010-32442 (hereinafter respectively referred to as PTL 2, PTL 3, and PTL 4), and Japanese Unexamined Patent Application Publication (Translation of PCT Application) Nos. 2007-518968 and 2012-524898 (hereinafter respectively referred to as PTL 5 and PTL 6).

For example, PTL 2 and PTL 3 disclose techniques for detecting the presence of an object and calculating the direction of movement by using ultra-wideband (UWB) radio signals. More specifically, UWB radio signals are transmitted to a predetermined area, and radio signals reflected by a target object, which is a detection target, are received by an array antenna. Then, only signals from the target object, which is moving, are separated by using the Doppler effect, and the presence of the moving object is detected and the direction of movement is calculated from a pair of the separated signals.

For example, PTL 4 and PTL 5 disclose technique for calculating the direction and position of a transmitter by performing a direction-of-arrival estimation process, which is one of the array antenna signal processing techniques, for a difference between reception timings at which UWB signals transmitted from the transmitter are received by an antenna.

For example, PTL 6 discloses a technique for estimating the position of a target object by using a direction estimation algorithm, such as the MUSIC method. Specifically, a direction estimation algorithm, such as the MUSIC method, is used in a plurality of receiving stations that receive signals transmitted from a transmitting station, and the results are integrated by performing multiplication or addition. Accordingly, highly accurate direction estimation can be achieved.

However, the present inventors have conducted a close examination and found that it is not possible to estimate the position of a living body with the techniques disclosed by PTL 2 to PTL 6. That is, it has been found that, with the methods disclosed by PTL 2 and PTL 3, it is possible to determine the presence or absence of a person but it is not possible to estimate the direction and position where the person is present. Further, it has been found that the techniques disclosed by PTL 4 to PTL 6 are position estimation techniques for a transmitter that transmits radio waves and that it is not possible to estimate the position of a living body with the techniques.

PTL 1 discloses a technique with which the position and state of a person, which is a detection target, can be known by using a Fourier transform and analyzing a component that includes a Doppler shift. NPL 1 discloses a technique for estimating the position of a detection target by using a fluctuating component extracted from propagation channel information and using the MUSIC method.

More specifically, in the techniques disclosed by PTL 1 and NPL 1, propagation channels between transmission antennas and reception antennas are observed, and time-series changes in the propagation channels are recorded. Thereafter, a Fourier transform process is performed for the propagation channels observed in the time series to convert the time response to a frequency response. Here, the plurality of transmission antennas and the plurality of reception antennas are present, and therefore, the frequency response is represented by a matrix having elements that are complex numbers. When a direction estimation algorithm or a position estimation algorithm, such as the MUSIC method, is applied to the frequency response matrix, the direction or position of the target can be identified. PTL 1 further discloses a technique with which even a plurality of targets can be simultaneously detected.

However, the techniques disclosed by PTL 1 and NPL 1 have shortcomings in that, in a state where the Doppler effect is not significant, such as in a case where a living body, which is a detection target, stands still, the range for which detection is possible decreases, and the detection area for which a living body can be detected is narrow accordingly. This is because, in the state where the Doppler effect is not significant, it is difficult to detect Doppler-shift weak signals due to internal noise of a receiver, interference waves from an object other than the detection target, and the presence of an object other than the detection target, which produces a Doppler shift. If a target living body is made to carry a special device, such as a transmitter, the living body can be detected even if the living body stands still.

In view of the above issues, the present inventors have conceived a sensor and so on with which it is possible to estimate the position at which a living body, which is a target, is present for a wider area with higher accuracy by using radio signals without making the living body carry a special device, such as a transmitter.

(1) A sensor according to an aspect of the present disclosure includes: at least one transmitting station that includes a transmission antenna; a plurality of receiving stations that each include a reception array antenna; a first circuit that extracts, from signals observed by the reception array antenna of each of the plurality of receiving stations, living-body components, which are signal components transmitted from the transmission antenna and reflected by at least one living body; a second circuit that calculates, from the living-body components extracted by the first circuit, a plurality of position spectral functions, which are evaluation functions for evaluating a position of the at least one living body when viewed from the plurality of respective receiving stations; and a third circuit that integrates the plurality of position spectral functions calculated by the second circuit into one position spectral function, and calculates at least one maximum value of the position spectral function obtained as a result of integration to estimate the position of the at least one living body.

In the above-described configuration, the position spectral functions obtained from complex transfer functions calculated in the plurality of receiving stations are integrated to thereby perform an estimation. Accordingly, it is possible to estimate the position at which a living body is present for a wider area with higher accuracy by using radio signals. For example, even in a case where signals from a living body, which is a target, are weak and some of the plurality of receiving stations fail to observe reflected waves from the living body, it is possible to estimate the position of the living body by using position spectral functions calculated from complex transfer functions obtained by the receiving stations that have successfully observed reflected waves from the living body.

(2) In the above-described aspect, the at least one transmitting station may include two or more transmitting stations, and the two or more transmitting stations may each include a transmission array antenna constituted by the transmission antenna having two or more elements.

(3) In the above-described aspect, the sensor may further include a fourth circuit that controls a transmission timing such that none of the two or more transmitting stations simultaneously perform transmission via the transmission array antenna.

(4) In the above-described aspect, the third circuit, which estimates the position of the at least one living body, may multiply the plurality of calculated position spectral functions by each other or add the plurality of calculated position spectral functions together to integrate the plurality of calculated position spectral functions into one position spectral function.

(5) In the above-described aspect, the second circuit, which calculates the plurality of position spectral functions, may calculate the plurality of position spectral functions on the basis of a MUltiple Signal Classification algorithm.

(6) A method for estimating a position of a living body according to an aspect of the present disclosure includes: extracting, from signals observed by a reception array antenna of each of a plurality of receiving stations, living-body components, which are signal components transmitted from a transmission antenna element of at least one transmitting station and reflected by at least one living body;

calculating, from the extracted living-body components, a plurality of position spectral functions, which are evaluation functions for evaluating a position of the at least one living body when viewed from the plurality of respective receiving stations; and integrating the plurality of calculated position spectral functions into one position spectral function, and calculating at least one maximum value of the position spectral function obtained as a result of integration to estimate the position of the at least one living body.

Note that the present disclosure can be implemented not only as an apparatus but also as an integrated circuit that includes processing units included in the apparatus, a method that includes the processing units included in the apparatus as steps, a program that causes a computer to execute the steps, or information, data, or a signal that represents the program. The program, the information, the data, and the signal may be distributed via a recording medium, such as a compact disc read-only memory (CD-ROM), or a communication medium, such as the Internet.

Hereinafter, embodiments of the present disclosure will be described in detail with reference to the drawings. All of the embodiments described below illustrate specific preferred examples of the present disclosure. For example, numerical values, shapes and forms, materials, constituent elements, the arrangements, positions, and connections of the constituent elements, steps, and the order of steps described in the following embodiments are illustrative and not intended to restrict the present disclosure. Among the constituent elements described in the following embodiments, a constituent element not described in an independent claim that defines the most general concept is described as an optional constituent element that constitutes a more preferred form. In the specification and drawings, constituent elements having substantially the same functional configurations are assigned the same reference numerals, and a duplicated description thereof is omitted.

First Embodiment

Now, a position estimation method and so on for a sensor 1 according to a first embodiment is described with reference to the drawings.

Configuration of Sensor 1

Figure 2:
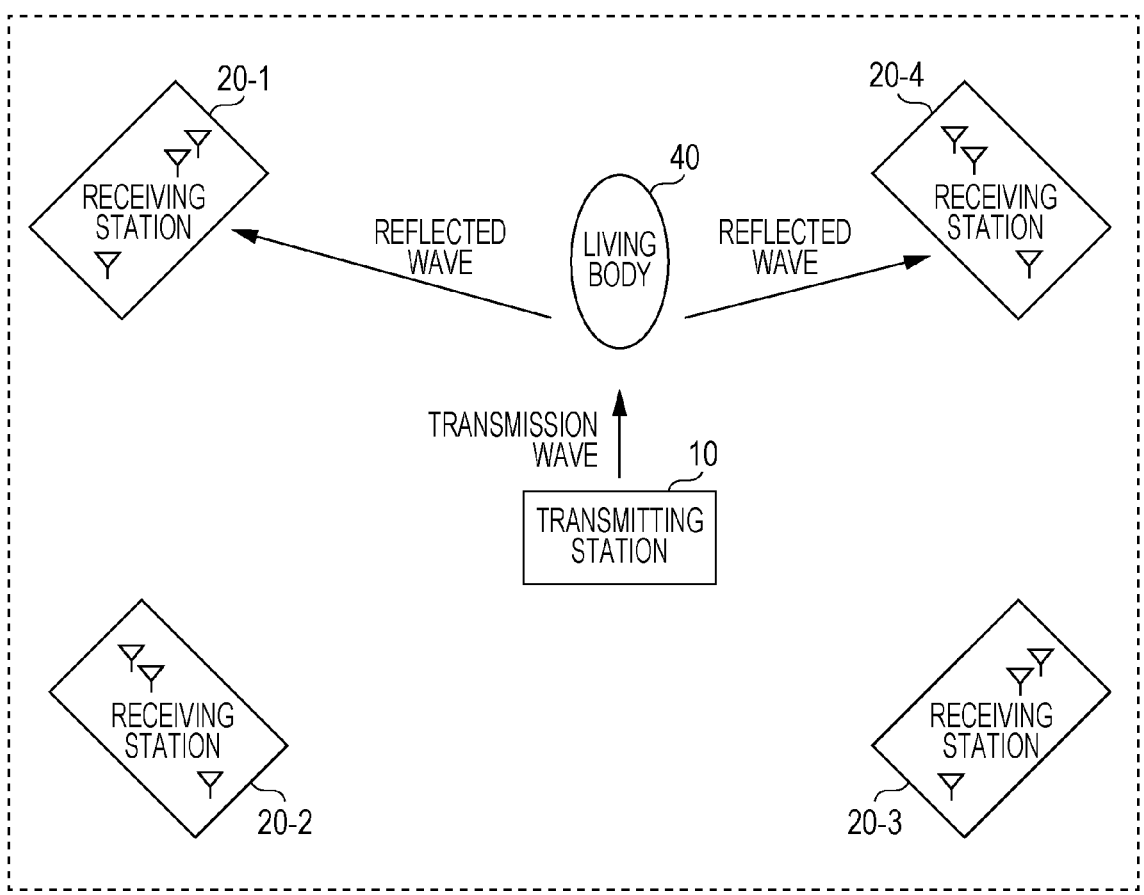
FIG. 2 is a diagram illustrating an example arrangement of a transmitting station and receiving stations according to the first embodiment.

FIG. 1 is a block diagram illustrating a configuration of the sensor 1 according to the first embodiment. FIG. 2 is a diagram illustrating an example arrangement of a transmitting station and receiving stations according to the first embodiment.

The sensor 1 illustrated in FIG. 1 includes a transmitting station 10, N receiving stations 20-1 to 20-N, and a position estimator 30. FIG. 2 assumes a case where N is equal to 4 and schematically illustrates an arrangement of the transmitting station 10 and the receiving stations 20-1 to 20-4 and a state where signals are transferred.

Transmitting Station 10

The transmitting station 10 includes a transmission antenna. Specifically, the transmitting station 10 is constituted by a transmitter 11 and a transmission antenna 12, as illustrated in FIG. 1.

The transmission antenna 12 is constituted by a transmission antenna having one element, that is, one transmission antenna element.

The transmitter 11 generates high-frequency signals that are used to estimate the direction of a living body 40. For example, the transmitter 11 transmits the generated signals via the transmission antenna 12 as transmission waves, as illustrated in FIG. 2.

Receiving Stations 20-1 to 20-N

The receiving stations 20-1 to 20-N each have a reception array antenna. Here, N is an integer equal to or larger than 2. For example, the i-th receiving station 20-$i$ (i is an integer equal to or larger than 1 and equal to or smaller than N) among the N receiving stations is described as a representative receiving station. All of the receiving stations 20-1 to 20-N have the same configuration and perform similar processing.

The receiving station 20-$i$ includes a reception antenna 21-$i$, a receiver 22-$i$, a complex transfer function calculator 23-$i$, a living-body component extractor 24-$i$, and a position spectral function calculator 25-$i$.

Reception Antenna 21-$i$

The reception antenna 21-$i$ is a reception array antenna constituted by a reception antenna having $M_R$ elements, that is, $M_R$ reception antenna elements. The reception antenna 21-$i$ receives high-frequency signals via the reception array antenna. In this embodiment, due to the arrangement as illustrated in, for example, FIG. 2, the reception antenna 21-$i$ may receive high-frequency signals including reflected waves, which are signals resulting from some of the transmission waves transmitted from the transmission antenna 12 being reflected by the living body 40.

Receiver 22-$i$

The receiver 22-$i$ converts high-frequency signals received by the reception antenna 21-$i$ to low-frequency signals that can be subjected to signal processing. The receiver 22-$i$ transfers the low-frequency signals obtained as a result of conversion to the complex transfer function calculator 23-$i$.

Complex Transfer Function Calculator 23-$i$

The complex transfer function calculator 23-$i$ calculates, from signals observed by the reception array antenna of the receiving station 20-$i$, a complex transfer function that represents propagation properties between the reception array antenna and the transmission antenna 12 of the transmitting station 10. More specifically, the complex transfer function calculator 23-$i$ calculates, from low-frequency signals transferred from the receiver 22-$i$, a complex transfer function that represents propagation properties between the one transmission antenna element of the transmission antenna 12 and the $M_R$ reception antenna elements of the reception array antenna. The complex transfer function calculated by the complex transfer function calculator 23-$i$ includes a reflected wave not coming via the living body 40, such as a direct wave from the transmission antenna 12 or a reflected wave from a fixed object. The complex transfer function calculated by the complex transfer function calculator 23-$i$ may include reflected waves, which are signals resulting from some of the transmission waves transmitted from the transmission antenna 12 being reflected by the living body 40. The amplitude and phase of a reflected wave reflected by the living body 40, that is, a reflected wave coming via the living body 40, always fluctuate in accordance with living-body activities, such as breathing and heartbeat, of the living body 40.

A description is given below under the assumption that a complex transfer function calculated by the complex transfer function calculator 23-$i$ includes a reflected wave, which is a signal reflected by the living body 40.

Living-Body Component Extractor 24-$i$

The living-body component extractor 24-$i$ extracts, from signals observed by the reception array antenna of the receiving station 20-$i$, living-body components, which are signal components transmitted from the transmission antenna 12 and reflected by at least one living body 40. More specifically, the living-body component extractor 24-$i$ records complex transfer functions calculated by the complex transfer function calculator 23-$i$ in the time series, that is, in the order in which the signals are observed. The living-body component extractor 24-$i$ extracts, as living-body components, fluctuating components produced due to the living body 40 from among changes in the complex transfer functions recorded in the time series. Examples of the method for extracting a fluctuating component produced due to a living body include a method in which only a component corresponding to vibrations of a living body is extracted after conversion to the frequency domain by performing, for example, a Fourier transform and a method in which a fluctuating component is extracted by calculating the difference between complex transfer functions at two different times. By using any of these methods, a complex transfer function of a direct wave and a complex transfer function of a reflected wave coming via a fixed object are removed, and only a complex transfer function of a reflected wave coming via the living body 40 remains.

In this embodiment, the $M_R$ reception antenna elements, that is, the plurality of reception antenna elements, constitute the reception array antenna, and therefore, a complex transfer function that corresponds to the reception array antenna includes a plurality of fluctuating components coming via the living body 40, that is, a plurality of living-body components. These components are hereinafter collectively referred to as a living-body component channel vector.

Position Spectral Function Calculator 25-$i$

The position spectral function calculator 25-$i$ calculates, from living-body components extracted by the living-body component extractor 24-$i$, a position spectral function, which is an evaluation function for evaluating the position of the at least one living body 40 when viewed from the receiving station 20-$i$. For example, the position spectral function calculator 25-$i$ may calculate a position spectral function on the basis of the MUSIC algorithm.

In this embodiment, the position spectral function calculator 25-$i$ calculates a correlation matrix $R_i$ of a living-body component channel vector extracted by the living-body component extractor 24-$i$ and calculates a position spectral function $P_i(\theta)$ for an angle $\theta_i$ between a predetermined reference direction at the receiving station 20-$i$ and the direction of the living body 40 when viewed from the receiving station 20-$i$ by using the obtained correlation matrix $R_i$ and in accordance with a predetermined direction-of-arrival estimation method.

The position spectral function calculator 25-$i$ transfers the calculated position spectral function $P_i(\theta)$ to the position estimator 30.

A procedure performed by the position spectral function calculator 25-$i$ to calculate the position spectral function $P_i(\theta)$ by using the MUSIC method is described below with reference to expressions. It is assumed that living-body components are extracted by using a Fourier transform.

For the correlation matrix $R_i$ of a living-body component channel vector, eigenvalue decomposition is performed as expressed by expression 1 to expression 3 below.

$$R_i = U_i \wedge_i U_i^H \quad \text{expression 1}$$

$$U_i = [u_1, \ldots, u_L, u_{L+1}, \ldots, u_{M_R}] \quad \text{expression 2}$$

$$\wedge_i = \text{diag}[\lambda_1, \ldots, \lambda_L, \lambda_{L+1}, \ldots, \lambda_{M_R}] \quad \text{expression 3}$$

Here, $M_R$ represents the number of antennas of the receiving station 20-$i$, $u_1, \ldots, u_{M_r}$ represents an eigenvector that includes $M_R$ elements, and $\lambda_1, \ldots, \lambda_{M_R}$ represent eigenvalues that correspond to the eigenvector and are in the following order.

$\lambda_1 \leq \lambda_2 \leq \ldots, \lambda_L \lambda_{L+1} \leq \ldots \leq \lambda_{M_R}$ L represents the number of incoming waves, that is, the number of living bodies, which are detection targets.

The steering vector, that is, the directional vector, of the reception array antenna can be defined by expression 4.

$$a(\theta) = [1, e^{-jkd \sin \theta}, \ldots, e^{-jkd(M_R-1)\sin \theta}]^T \quad \text{expression 4}$$

Here, k represents the number of waves. In the MUSIC method, this steering vector is used to calculate the position spectral function $P_i(\theta)$ as expressed by expression 5.

$$P_i(\theta) = \frac{1}{|a^H(\theta)[u_{L+1}, \ldots, u_{M_R}]|^2} \quad \text{expression 5}$$

The position spectral function $P_i(\theta)$ has the minimum denominator for an angle at which a living body is present when viewed from the receiving station 20-$i$, which is the i-th receiving station, and has the maximum value accordingly.

In the case of calculating the position spectral function, the beamformer method or the Capon method may be used instead of the MUSIC method.

Position Estimator 30

To the position estimator 30, position spectral functions calculated by the N respective position spectral function calculators 25-1 to 25-N are transferred. The position estimator 30 integrates the plurality of position spectral functions calculated by the respective position spectral function calculators 25-1 to 25-N into one function and calculates at least one maximum value of the integrated position spectral function to thereby estimate the position of the at least one living body 40. The position estimator 30 multiplies the plurality of calculated position spectral functions by each other or adds the plurality of calculated position spectral functions together to thereby integrate the plurality of calculated position spectral functions into one function.

In this embodiment, the position estimator 30 integrates N position spectral functions $P_i(\theta)$ and estimates the position of the living body 40 on the basis of the integrated position spectral function. More specifically, the position estimator 30 obtains, from the N receiving stations 20-1 to 20-N, the respective position spectral functions $P_i(\theta)$ calculated by using, for example, expression 5. The position estimator 30 calculates a position spectral function $P_{all}(\Theta)$ by using expression 6 and expression 7 and integrating the N obtained position spectral functions $P_i(\theta)$.

$$P_{a11}(\Theta) = \Pi_{i=1}^M P_i(\theta_i) \quad \text{expression 6}$$

$$\Theta = [\theta_1, \ldots, \theta_i \ldots, \theta_N] \quad \text{expression 7}$$

Here, $\Pi$ represents a product calculation.

Each of the position spectral functions $P_i(\theta)$ has the maximum value for an angle at which the living body 40 is present when viewed from the corresponding receiving station 20-$i$, and does not have a value equal to 0 for the other angles including an angle of a direction outside the measurement area. Therefore, by multiplying the N position spectral functions by each other, an evaluation function that reflects results obtained from all of the N receiving stations, that is, the integrated position spectral function, can be obtained. Then, by searching for the maximum value of the integrated position spectral function $P_{all}(\Theta)$, the position of the living body 40, which corresponds to the direction of the incoming wave, can be estimated.

Operations of Sensor 1

A process performed by the sensor 1 configured as described above to estimate the position of a living body is described below.

Figure 3:
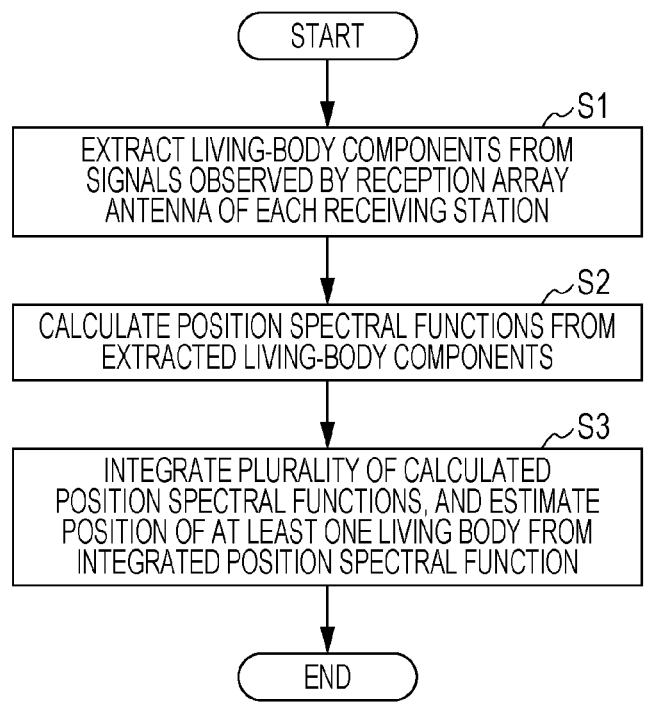
FIG. 3 is a flowchart illustrating a position estimation process performed by the sensor according to the first embodiment.

FIG. 3 is a flowchart illustrating a position estimation process performed by the sensor 1 according to the first embodiment. FIG. 4 is a flowchart illustrating the details of the position estimation process illustrated in FIG. 3.

First, as illustrated in FIG. 3, the sensor 1 extracts, from signals observed by the reception array antenna of each of the plurality of receiving stations 20-1 to 20-N, living-body components, which are signal components transmitted from the transmission antenna element of the transmitting station 10 and reflected by at least one living body (step S1). More specifically, as illustrated in FIG. 4, the sensor 1 first observes reception signals for a predetermined period at the N receiving stations (step S11). Subsequently, the sensor 1 calculates a complex transfer function from the reception signals observed by the reception array antenna of each of the N receiving stations (step S12). Thereafter, the sensor 1 records the calculated complex transfer functions in the time series and extracts living-body components from the complex transfer functions recorded in the time series (step S13).

Next, as illustrated in FIG. 3, the sensor 1 calculates position spectral functions, which are evaluation functions for evaluating the position of the at least one living body 40 when viewed from the plurality of respective receiving stations 20-1 to 20-N, from the living-body components extracted in step S1 (step S2). More specifically, as illustrated in FIG. 4, the sensor 1 first calculates correlation matrices of the living-body components extracted in step S13 (step S21). Subsequently, the sensor 1 uses the correlation matrices calculated in step S21 to calculate position spectral functions of the living body 40 when viewed from the N respective receiving stations (step S22).

Next, as illustrated in FIG. 3, the sensor 1 integrates the plurality of position spectral functions calculated in step S2 into one function and calculates at least one maximum value of the integrated position spectral function to thereby estimate the position of the at least one living body (step S3). More specifically, as illustrated in FIG. 4, the sensor 1 first multiplies the N position spectral functions calculated in step S22 by each other or adds the N position spectral functions calculated in step S22 together to integrate the N position spectral functions into one function (step S31). Thereafter, the sensor 1 calculates at least one maximum value of the position spectral function integrated in step S31 to thereby estimate the position of the at least one living body 40 (step S32).

Effects

With the sensor 1 and the position estimation method according to this embodiment, it is possible to estimate the position at which a living body is present for a wider area with higher accuracy by using radio signals. In the sensor 1 and the position estimation method according to this embodiment, a plurality of receiving stations are used, and therefore, it is possible to widen a detection area for which a living body can be detected. More specifically, in the sensor 1 and the position estimation method according to this embodiment, living-body components are extracted from information about complex transfer functions calculated by the plurality of receiving stations, and position spectral functions calculated from the extracted living-body components are integrated to thereby estimate the position of a living body. Accordingly, it is possible to estimate the position at which a living body is present for a wider area without an influence of an obstacle. For example, even in a case where signals from a living body, which is a target, are weak and some of the plurality of receiving stations fail to observe reflected waves from the living body, it is possible to estimate the position of the living body by using position spectral functions calculated from complex transfer functions obtained by the receiving stations that have successfully observed reflected waves from the living body.

The sensor 1 according to this embodiment is capable of estimating the position of a living body for a wide area, which is described below with reference to FIG. 5A and FIG. 5B.

Figure 5A:
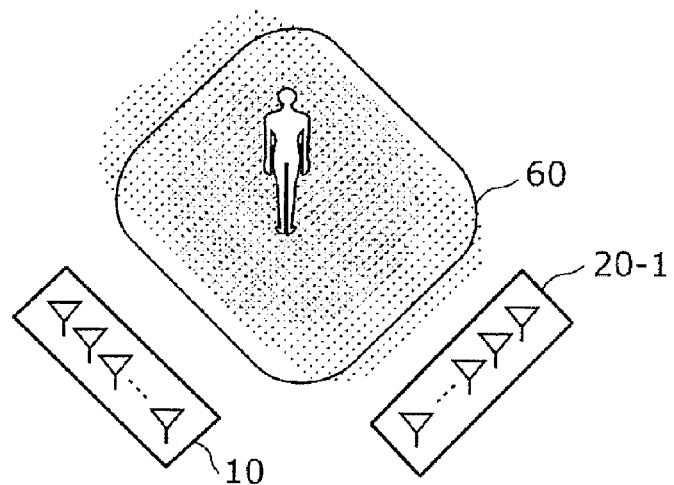
FIG. 5A is a diagram illustrating an area for which the position of a living body can be estimated according to a comparative example.
Figure 5B:
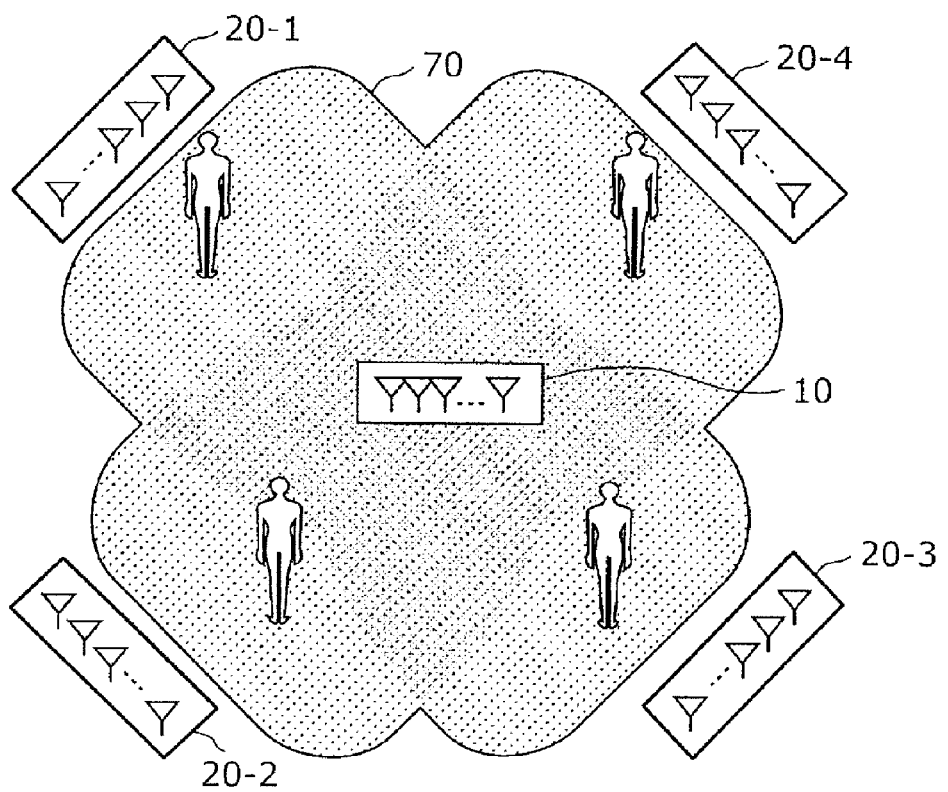
FIG. 5B is a diagram illustrating an area for which the position of a living body can be estimated according to the first embodiment.

FIG. 5A is a diagram illustrating an area for which the position of a living body can be estimated according to a comparative example. FIG. 5B is a diagram illustrating an area for which the position of a living body can be estimated according to this embodiment. In FIG. 5A, which illustrates a comparative example, a detection area 60 for which the position of a living body can be estimated by using one transmitting station 10 and one receiving station 20-1 and using, for example, a multiple-input multiple-output (MIMO) radar is shown. The detection area 60 corresponds to an area in which a beam output from the one transmitting station 10 and a beam output from the one receiving station 20-1 overlap. In FIG. 5B, which illustrates this embodiment, a detection area 70 for which the position of a living body can be estimated by the sensor 1 using one transmitting station 10 and four receiving stations 20-1 to 20-4 is shown. The detection area 70 is wider than the detection area 60 according to the comparative example. The sensor 1 according to this embodiment is able to estimate the position of a living body by integrating position spectral functions calculated on the basis of signals received by the plurality of receiving stations into one function, and therefore, is able to make the plurality of receiving stations cooperate with each other. Accordingly, it is possible to widen the detection area in which Doppler-shift components produced due to a living body can be received. When the plurality of receiving stations are made to cooperate with each other, if some of the plurality of receiving stations successfully extract living-body components, the position of a living body can be estimated, resulting in increased estimation accuracy.

Modification

Figure 6:
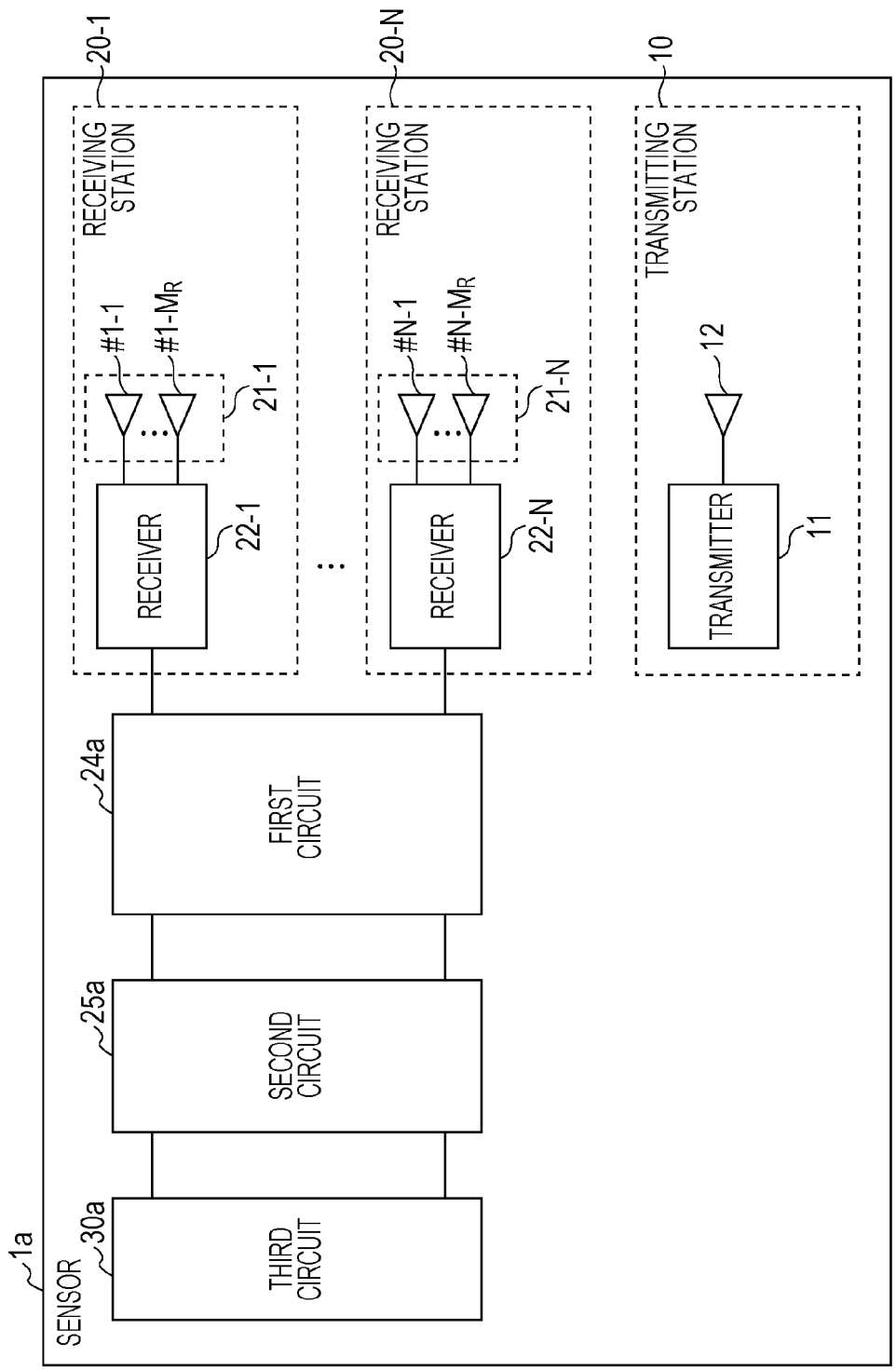
FIG. 6 is a block diagram illustrating a configuration of a sensor according to a modification of the first embodiment.

FIG. 6 is a block diagram illustrating a configuration of a sensor 1a according to a modification of the first embodiment. In FIG. 6, an element the same as an element in FIG. 1 is assigned the same reference numeral as that in FIG. 1, and a detailed description thereof is omitted.

In the sensor 1 illustrated in FIG. 1, each of the plurality of receiving stations 20-1 to 20-N includes the complex transfer function calculator 23-$i$, the living-body component extractor 24-$i$, and the position spectral function calculator 25-$i$; however, the configuration is not limited to this. As in the sensor 1a illustrated in FIG. 6, each of the plurality of receiving stations 20-1 to 20-N need not include the complex transfer function calculator 23-$i$, the living-body component extractor 24-$i$, and the position spectral function calculator 25-$i$. In this case, the sensor 1a needs to include a first circuit 24a and a second circuit 25a instead of the complex transfer function calculator 23-$i$, the living-body component extractor 24-$i$, and the position spectral function calculator 25-$i$. The sensor 1a further includes a third circuit 30a, which implements the function of the position estimator 30. The remaining configuration is the same as that of the sensor 1 illustrated in FIG. 1, and therefore, a description thereof is omitted.

The first circuit 24a is a circuit that implements the function of the N complex transfer function calculators and the function of the N living-body component extractors. More specifically, the first circuit 24a extracts, from signals observed by the reception array antenna of each of the plurality of receiving stations 20-1 to 20-N, living-body components, which are signal components transmitted from the transmission antenna element of the transmitting station 10 and reflected by at least one living body.

The second circuit 25a is a circuit that implements the function of the N position spectral function calculators. More specifically, the second circuit 25a calculates, from living-body components extracted by the first circuit 24a, position spectral functions, which are evaluation functions for evaluating the position of at least one living body 40 when viewed from the plurality of respective receiving stations 20-1 to 20-N.

The third circuit 30a is a circuit that implements the function of the position estimator 30. The third circuit 30a integrates a plurality of position spectral functions calculated by the second circuit 25a into one function and calculates at least one maximum value of the integrated position spectral function to thereby estimate the position of the at least one living body 40.

Second Embodiment

In the first embodiment, the case where the sensor 1 includes one transmitting station has been described; however, the configuration is not limited to this. In a second embodiment, a position estimation method and so on for a sensor 1A that includes two or more transmitting stations or two or more transmission antenna elements is described.

Configuration of Sensor 1A

Figure 7:
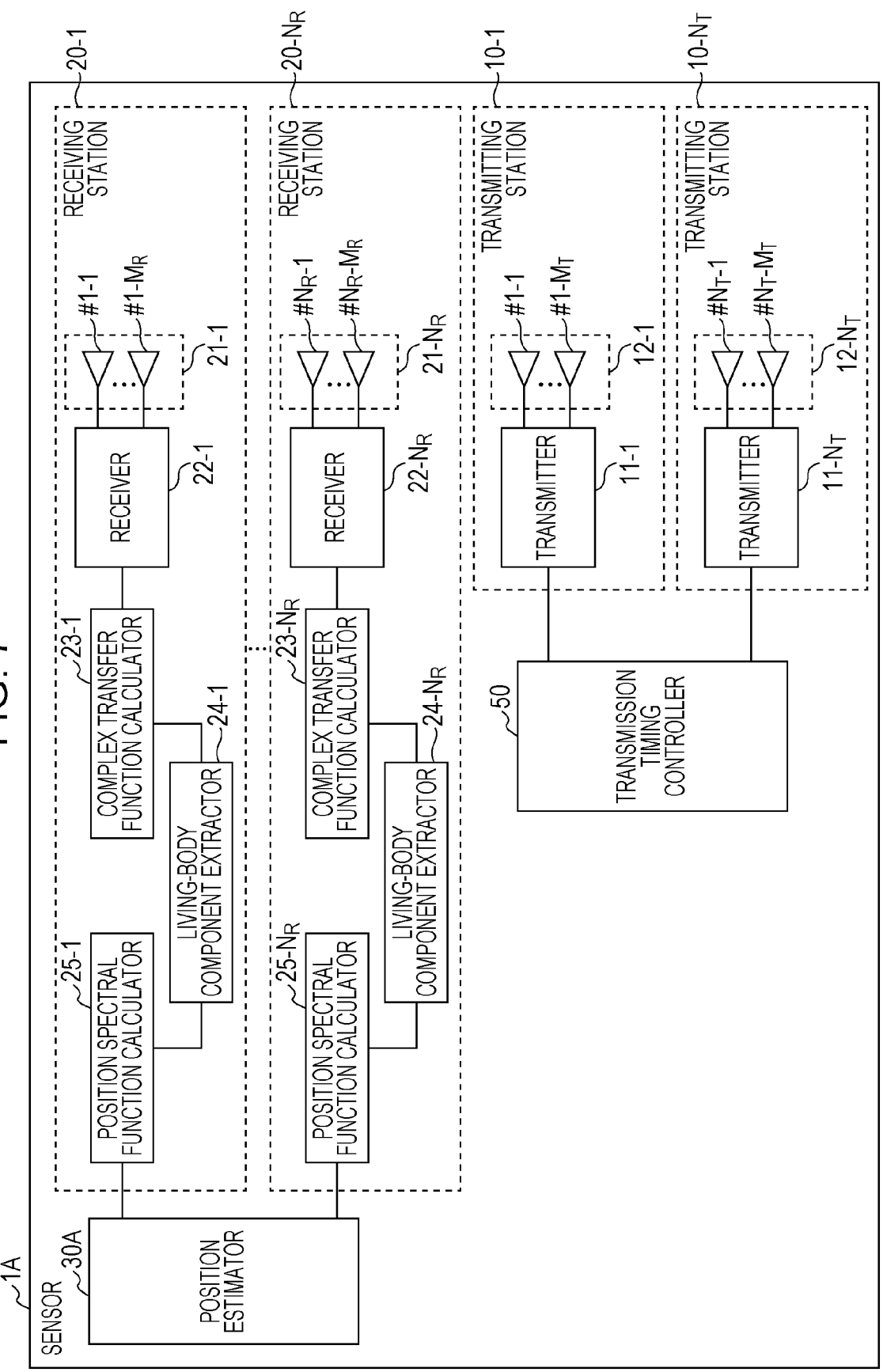
FIG. 7 is a block diagram illustrating a configuration of a sensor according to a second embodiment.
Figure 8:
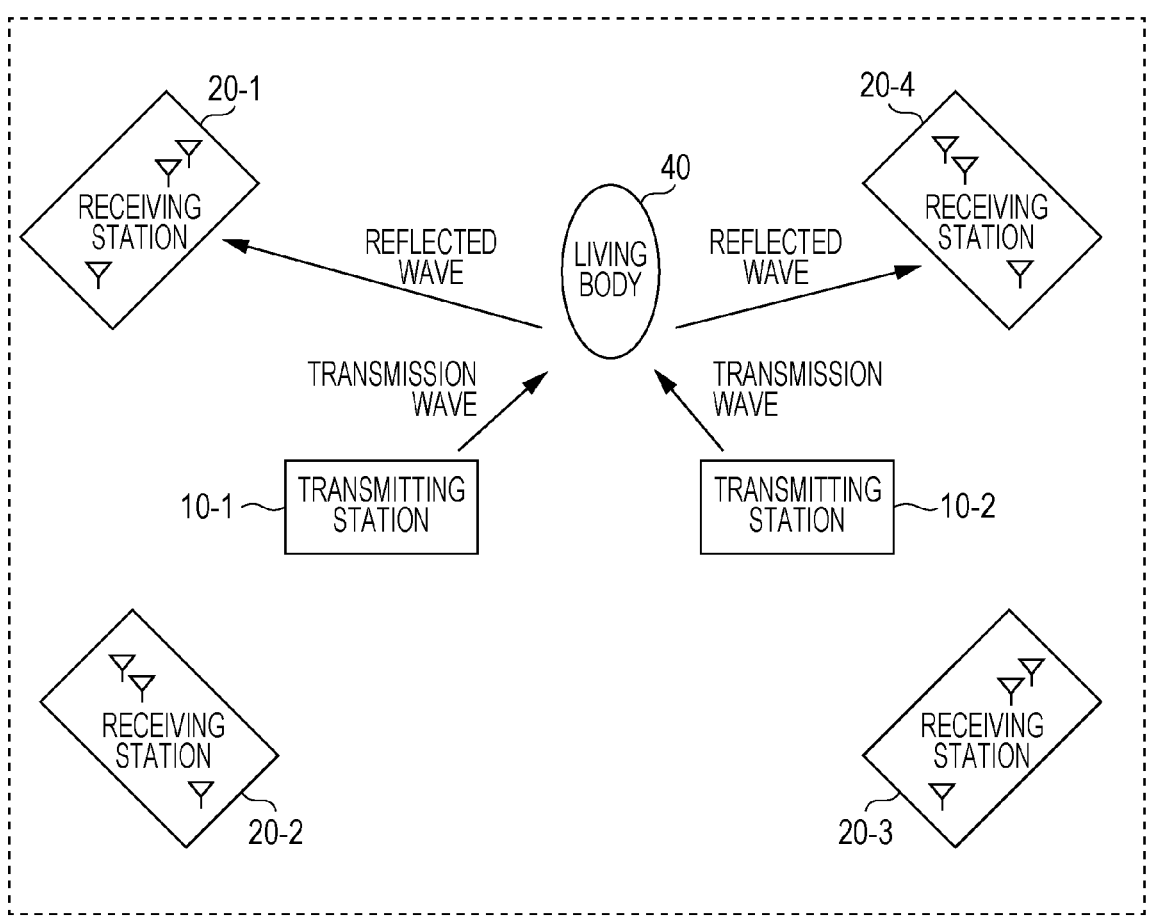
FIG. 8 is a diagram illustrating an example arrangement of transmitting stations and receiving stations according to the second embodiment.

FIG. 7 is a block diagram illustrating a configuration of the sensor 1A according to the second embodiment. FIG. 8 is a diagram illustrating an example arrangement of transmitting stations and receiving stations according to the second embodiment. In FIG. 7 and FIG. 8, an element the same as an element in FIG. 1 or FIG. 2 is assigned the same reference numeral as that in FIG. 1 or FIG. 2, and a detailed description thereof is omitted.

The sensor 1A illustrated in FIG. 7 includes $N_T$ transmitting stations 10-1 to 10-$N_T$, $N_R$ receiving stations 20-1 to 20-$N_R$, a position estimator 30A, and a transmission timing controller 50. FIG. 8 assumes a case where $N_T$ is equal to 2 and $N_R$ is equal to 4, and schematically illustrates an arrangement of the transmitting stations 10-1 and 10-2 and the receiving stations 20-1 to 20-4 and a state where signals are transferred.

Transmitting Stations 10-1 to 10-$N_T$

The transmitting stations 10-1 to 10-$N_T$ each include a transmission array antenna constituted by a transmission antenna having two or more elements. Here, $N_T$ is an integer equal to or larger than 2. For example, the j-th transmitting station 10-j (j is an integer equal to or larger than 1 and equal to or smaller than $N_T$) among the $N_T$ transmitting stations is described as a representative transmitting station. All of the transmitting stations have the same configuration and perform similar processing. It is desirable to arrange the transmitting stations 10-1 to 10-$N_T$ such that an angle formed by a transmitting station and another transmitting station is not equal to 180 degrees or 90 degrees.

The transmitting station 10-j includes a transmission antenna 12-j and a transmitter 11-j.

Transmission Antenna 12-j

The transmission antenna 12-j is a transmission array antenna including a transmission antenna having $M_T$ elements. The transmission antenna 12-j transmits high-frequency signals via the transmission array antenna. In this embodiment, the transmission antenna 12-j transmits transmission waves, which are high-frequency signals, to an area that includes the living body 40, as illustrated in, for example, FIG. 8.

Transmitter 11-j

The transmitter 11-j generates high-frequency signals that are used to estimate the position of the living body 40. The transmitter 11-j transmits the generated high-frequency signals via the transmission antenna 12-j as transmission waves. The transmitter 11-j is controlled by the transmission timing controller 50 so as not to transmit transmission waves simultaneously with another transmitting station.

Transmission Timing Controller 50

The transmission timing controller 50 is an example of a fourth circuit. The transmission timing controller 50 controls a transmission timing so that none of the two or more transmitting stations, namely, the transmitting stations 10-1 to 10-$N_T$, simultaneously perform transmission via the respective transmission array antennas.

Receiving Stations 20-1 to 20-$N_R$

The receiving stations 20-1 to 20-$N_R$ each include a reception array antenna. Here, $N_R$ is an integer equal to or larger than 2. For example, the i-th receiving station 20-i (i is an integer equal to or larger than 1 and equal to or smaller than $N_R$) among the $N_R$ receiving stations is described as a representative receiving station. All of the receiving stations have the same configuration and perform similar processing.

The receiving station 20-i includes the reception antenna 21-i, the receiver 22-i, the complex transfer function calculator 23-i, the living-body component extractor 24-i, and the position spectral function calculator 25-i.

Reception Antenna 21-i

The reception antenna 21-i is a reception array antenna constituted by a reception antenna having $M_R$ elements, that is, $M_R$ reception antenna elements. The reception antenna 21-i receives high-frequency signals via the reception array antenna. In this embodiment, due to the arrangement as illustrated in, for example, FIG. 8, the reception antenna 21-i may receive high-frequency signals including reflected waves, which are signals resulting from some of the transmission waves transmitted from any of the transmission antennas 12-1 to 12-$N_T$ being reflected by the living body 40.

Receiver 22-i

The receiver 22-i converts high-frequency signals received by the reception antenna 21-i to low-frequency signals that can be subjected to signal processing. The receiver 22-i transfers the low-frequency signals obtained as a result of conversion to the complex transfer function calculator 23-i.

Complex Transfer Function Calculator 23-i

The complex transfer function calculator 23-i calculates, from signals observed by the reception array antenna of the receiver 22-i, a complex transfer function that represents propagation properties between the reception array antenna and one of the transmission antennas 12-1 to 12-$N_T$ of the transmitting stations 10-1 to 10-$N_T$.

In this embodiment, the plurality of transmitting stations 10-1 to 10-$N_T$ are present; however, the transmission timing controller 50 performs control so that a signal transmitted from only one of the transmitting stations is received at a specific time. Therefore, the complex transfer function calculator 23-$i$ can calculate a complex transfer function for a specific transmitting station at a separate time.

A description is given below under the assumption that a complex transfer function calculated by the complex transfer function calculator 23-$i$ includes a reflected wave, which is a signal reflected by the living body 40.

Living-Body Component Extractor 24-$i$

The living-body component extractor 24-$i$ extracts, from signals observed by the reception array antenna of the receiver 22-$i$, living-body components, which are signal components transmitted from one of the transmission antennas 12-1 to 12-$N_T$ and reflected by at least one living body 40. More specifically, the living-body component extractor 24-$i$ records complex transfer functions calculated by the complex transfer function calculator 23-$i$ in the time series, that is, in the order in which the signals are observed. The living-body component extractor 24-$i$ extracts, as living-body components, fluctuating components produced due to the living body 40 from among changes in the complex transfer functions recorded in the time series.

In this embodiment, the plurality of transmission antenna elements constitute the transmission array antenna, and the plurality of reception antenna elements constitute the reception array antenna, and therefore, a complex transfer function that corresponds to the reception array antenna includes a plurality of fluctuating components coming via the living body 40, that is, a plurality of living-body components. These components are collectively referred to as a living-body component channel vector.

Position Spectral Function Calculator 25-$i$

The position spectral function calculator 25-$i$ calculates, from living-body components extracted by the living-body component extractor 24-$i$, a position spectral function, which is an evaluation function for evaluating the position of the at least one living body 40 when viewed from the receiving station 20-$i$. For example, the position spectral function calculator 25-$i$ may calculate a position spectral function on the basis of the MUSIC algorithm.

In this embodiment, the position spectral function calculator 25-$i$ calculates a correlation matrix $R_{i,j}$ of a living-body component channel vector extracted by the living-body component extractor 24-$i$ and calculates a position spectral function $P_{i,j}(\theta_T, \theta_R)$ for an angle θR between the predetermined reference direction at the receiving station 20-$i$ and the direction of the living body 40 when viewed from the receiving station 20-$i$ and for an angle $\theta_T$ between a predetermined reference direction at the receiving station 10-$j$ and the direction of the living body 40 when viewed from the transmitting station 10-$j$ by using the obtained correlation matrix and in accordance with a predetermined direction-of-arrival estimation method. The position spectral function calculator 25-$i$ transfers the calculated position spectral function $P_{i,j}(\theta_T, \theta_R)$ to the position estimator 30A.

A procedure performed by the position spectral function calculator 25-$i$ to calculate the position spectral function $P_{i,j}(\theta_T, \theta_R)$ by using the MUSIC method is described below with reference to expressions. It is assumed that living-body components are extracted by using a Fourier transform.

For the correlation matrix of a living-body component channel vector, eigenvalue decomposition is performed as expressed by expression 8 to expression 10 below.

$$R_{i,j} = U_{i,j} \Lambda_{i,j} U_{i,j}^H \qquad \text{expression 8}$$

$$U_{i,j} u_1, \ldots, u_L, u_{L+1} \ldots, u_{M_R}] \qquad \text{expression 9}$$

$$\Lambda_{i,j} = \text{diag}[\lambda_1, \ldots, \lambda_L, \lambda_{L+1} \ldots, \lambda_{M_R}] \qquad \text{expression 10}$$

Here, $M_R$ represents the number of antennas of the receiving station 20-$i$, $M_T$ represents the number of antennas of the transmitting station 10-$j$, $u_1, \ldots, u_{M_R}$ represents an eigenvector that includes $M_R$ elements, and $\lambda_1, \ldots, \lambda_{M_R}$ represent eigenvalues that correspond to the eigenvector and are in the following order.

$\lambda_1 \leq \lambda_2 \leq \ldots \leq \lambda_L \leq \lambda_{L+1} \leq \ldots \leq \lambda_{M_R}$ L represents the number of incoming waves, that is, the number of living bodies, which are detection targets.

The steering vector, that is, the directional vector, of the reception array antenna can be defined by expression 11.

$$a_R(\theta) = [1, e^{-jkd \sin \theta}, \ldots, e^{-jkd(M_R-1)\sin \theta}]^T \qquad \text{expression 11}$$

The steering vector of the transmission array antenna can be similarly defined by expression 12.

$$a_T(\theta) = [1, e^{-jkd \sin \theta}, \ldots, e^{-jkd(M_T-1)\sin \theta}]^T \qquad \text{expression 12}$$

Here, k represents the number of waves. Further, the transmission steering vector and the reception steering vector are multiplied by each other to define a steering vector that takes into consideration both transmission angle information and reception angle information, as expressed by expression 13.

$$a(\theta_T, \theta_R) = \text{vec}\{a_T(\theta_T) a_R^T(\theta_R)\} \qquad \text{expression 13}$$

The MUSIC method is applied to the steering vector defined by expression 13, and the position spectral function $P_{i,j}(\theta_T, \theta_R)$ is calculated by using the steering vector, as expressed by expression 14.

$$P_{i,j}(\theta_T, \theta_R) = \frac{1}{|a^H(\theta)[u_{L+1}, \ldots, u_{M_R}]|^2} \qquad \text{expression 14}$$

The position spectral function $P_{i,j}(\theta_T, \theta_R)$ has the minimum denominator in a case where $\theta_R$ is an angle at which the living body 40 is present when viewed from the receiving station 20-$i$ and $\theta_T$ is an angle at which the living body 40 is present when viewed from the transmitting station 10-$j$, and has the maximum value accordingly.

In the case of calculating the position spectral function, the beamformer method or the Capon method may be used instead of the MUSIC method.

In this embodiment, the description has been given under the assumption that the plurality of receiving stations each include the complex transfer function calculator, the living-body component extractor, and the position spectral function calculator; however, the configuration is not limited to this. As in the modification of the first embodiment, the sensor 1A may include a first circuit that implements the function of the $N_R$ complex transfer function calculators and the function of the $N_R$ living-body component extractors, and a second circuit that implements the function of the $N_R$ position spectral function calculators.

Position Estimator 30A

To the position estimator 30A, $N_R \times N_T$ position spectral functions calculated by the position spectral function calculators 25-1 to 25-$N_R$ are transferred. The position estimator 30A is an example of a third circuit. The position estimator 30A integrates a plurality of position spectral functions calculated by each of the position spectral function calculators 25-1 to 25-$N_R$ into one function and calculates at least one maximum value of the integrated position spectral function to thereby estimate the position of the at least one living body 40. The position estimator 30A multiplies the plurality of calculated position spectral functions by each other or adds the plurality of calculated position spectral functions together to thereby integrate the plurality of calculated position spectral functions into one function.

In this embodiment, the position estimator 30A obtains the position spectral functions $P_{i,j}(\theta_T, \theta_R)$ calculated by the $N_R$ receiving stations 20-1 to 20-$N_R$ using, for example, expression 14. The position estimator 30A calculates a position spectral function $P_{all}(\Theta_T, \Theta_R)$ by using expression 15 to expression 17 and integrating the $N_R \times N_T$ obtained position spectral functions.

$$P_{all}(\Theta_T,\Theta_R)=\Pi_{(i,j)=(1,1)}^{(M_R,M_T)} P_{i,j}(\theta_T,\theta_R) \quad \text{expression 15}$$

$$\Theta_T=[\theta_1, \ldots \theta_i, \ldots \theta_{N_T}] \quad \text{expression 16}$$

$$\Theta_R=[\theta_1, \ldots \theta_i, \ldots \theta_{N_R}] \quad \text{expression 17}$$

Here, Π represents a product calculation.

Each of the position spectral functions $P_{i,j}(\theta_T, \theta_R)$ has the maximum value for an angle at which the living body 40 is present when viewed from the corresponding receiving station 20-$i$, and does not have a value equal to 0 for the other angles including an angle of a direction outside the measurement area. Therefore, by multiplying the $N_R \times N_T$ position spectral functions by each other, a position spectral function that reflects results obtained from all of the $N_R \times N_T$ stations can be obtained. Then, by searching for the maximum value of the integrated position spectral function $P_{all}(\Theta_T, \Theta_R)$ the position of the living body 40, which corresponds to the direction of the incoming wave, can be estimated.

Operations of Sensor 1A

A process performed by the sensor 1A configured as described above to estimate the position of a living body is described below.

Figure 9:
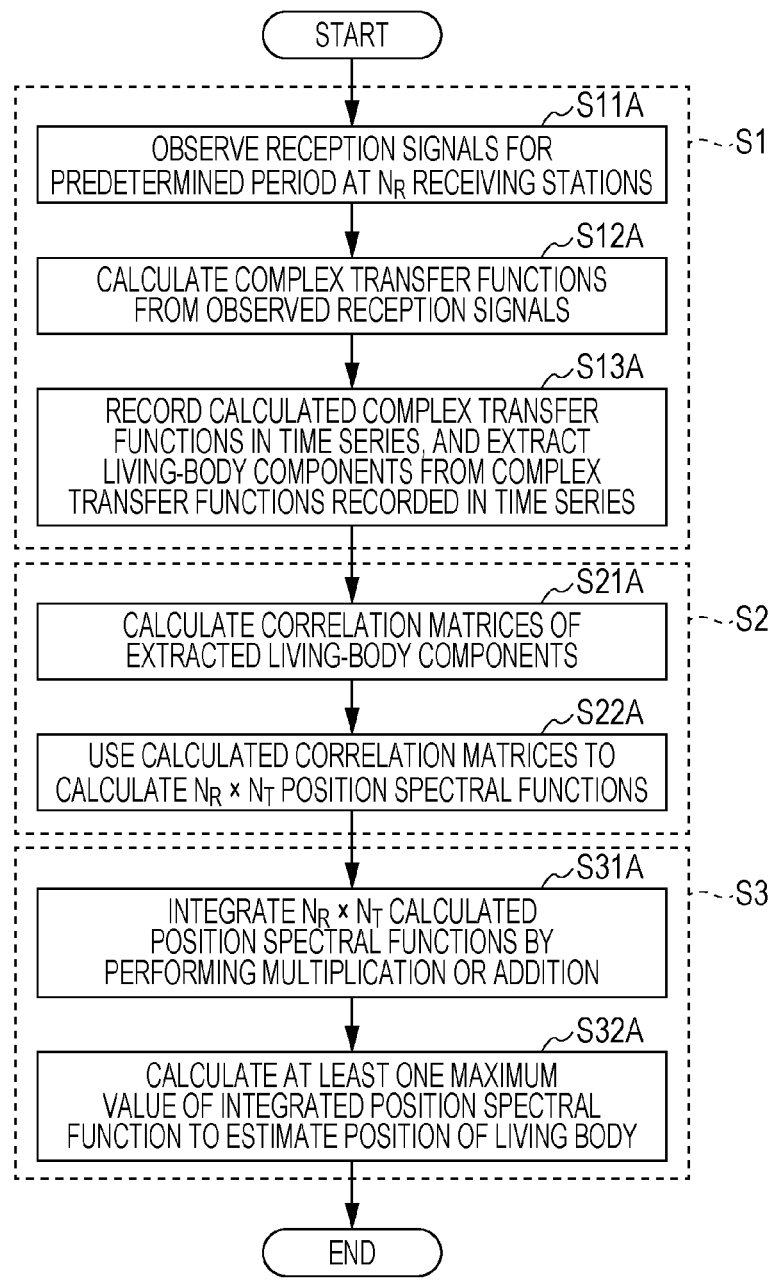
FIG. 9 is a flowchart illustrating the details of a position estimation process performed by the sensor according to the second embodiment.

FIG. 9 is a flowchart illustrating the details of a position estimation process performed by the sensor 1A according to the second embodiment. FIG. 9 is a flowchart illustrating the details, according to this embodiment, of the position estimation process illustrated in FIG. 3.

First, in step S1, the sensor 1A observes reception signals for a predetermined period at the $N_R$ receiving stations (step S11A). Subsequently, the sensor 1A calculates a complex transfer function that represents propagation properties between the transmission antenna elements and the reception antenna elements from the reception signals observed by the reception array antenna of each of the $N_R$ receiving stations (step S12A). Thereafter, the sensor 1A records the calculated complex transfer functions in the time series and extracts living-body components, which are fluctuating components produced due to a living body, from the complex transfer functions recorded in the time series (step S13A).

Next, in step S2, the sensor 1A calculates correlation matrices of the living-body components extracted in step S13A (step S21A). Subsequently, the sensor 1A uses the correlation matrices calculated in step S21A to calculate $N_R \times N_T$ position spectral functions that correspond to the directions of the living body 40 when viewed from the $N_R$ respective receiving stations and the directions of the living body 40 when viewed from the $N_T$ respective transmitting stations (step S22A).

Next, in step S3, the sensor 1A multiplies the $N_R \times N_T$ position spectral functions calculated in step S22A by each other or adds the $N_R \times N_T$ position spectral functions calcu-lated in step S22A together to integrate the $N_R \times N_T$ position spectral functions into one function (step S31A). Thereafter, the sensor 1A calculates at least one maximum value of the position spectral function integrated in step S31A to thereby estimate the position of the at least one living body 40 (step S32A).

Effects

With the sensor 1A and the position estimation method according to this embodiment, it is possible to estimate the position at which a living body is present for a wider area with higher accuracy by using radio signals.

In the sensor 1A and the position estimation method according to this embodiment, the number of transmitting stations and the number of receiving stations are increased to thereby widen an area in which Doppler-shift components produced due to a living body can be received. Accordingly, an effect is produced in which position estimation is possible without a decrease in accuracy even in a case where a plurality of living bodies, which are detection targets, are present.

Operative Example

To verify the effects of the second embodiment, an experiment was carried out to evaluate the second embodiment, which is described below as an operative example.

Figure 10:
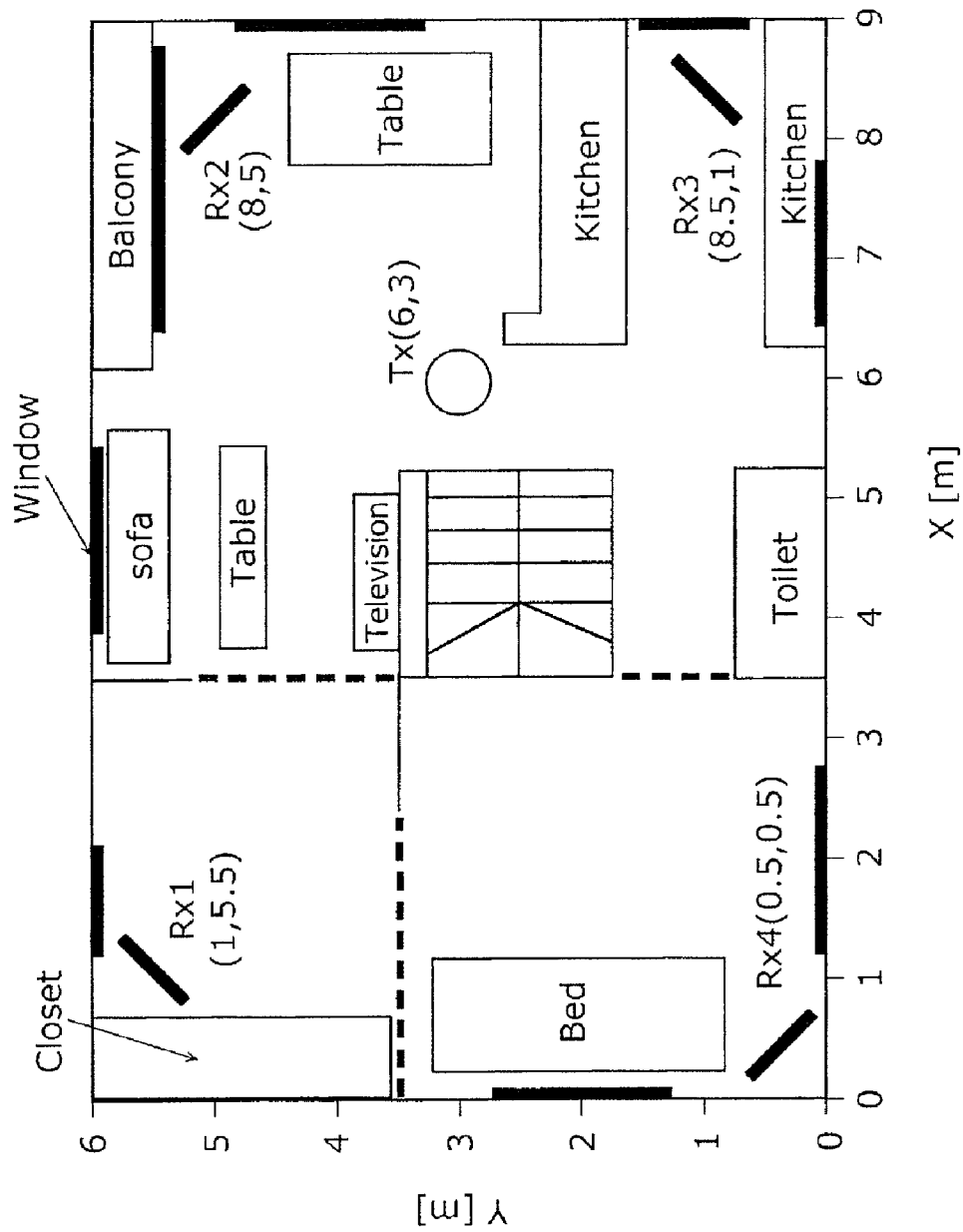
FIG. 10 is a diagram illustrating an environment in which an experiment was carried out according to an operative example of the second embodiment.

FIG. 10 is a diagram illustrating an environment in which an experiment was carried out according to this operative example.

This experiment was carried out in a wooden house having a width of 9 m and a depth of 6 m. In the experiment, an 8-element circular sleeve antenna was used as a transmission antenna that constitutes the transmitting station indicated by Tx in FIG. 10, and a 4-element linear array antenna was used as a reception antenna that constitutes each of the receiving stations indicated by Rx1 to Rx4 in FIG. 10. The transmitting station Tx was arranged at a position indicated by coordinates (6, 3), and the receiving stations Rx1 to Rx4 were arranged in the four corners of the measurement area indicated by coordinates (1, 5.5), (8, 5), (8.5, 1), and (0.5, 0.5) respectively. The spacing between the transmission/reception array elements, that is, the spacing between the elements of the 8-element circular sleeve antenna, was set to 0.5 wavelength, the use frequency was set to 2.47125 GHz, the antenna height was set to 115 cm, the sampling frequency was set to 100 Hz, the frequency range of living-body activities to be extracted was set to a range from 0.3 to 3.3 Hz, and the measurement time was set to 20 seconds. In the experiment, the measurement target was one person, and the measurement target was placed at 23 points within the wooden house, that is, in the experiment environment, to measure channels.

Figure 11:
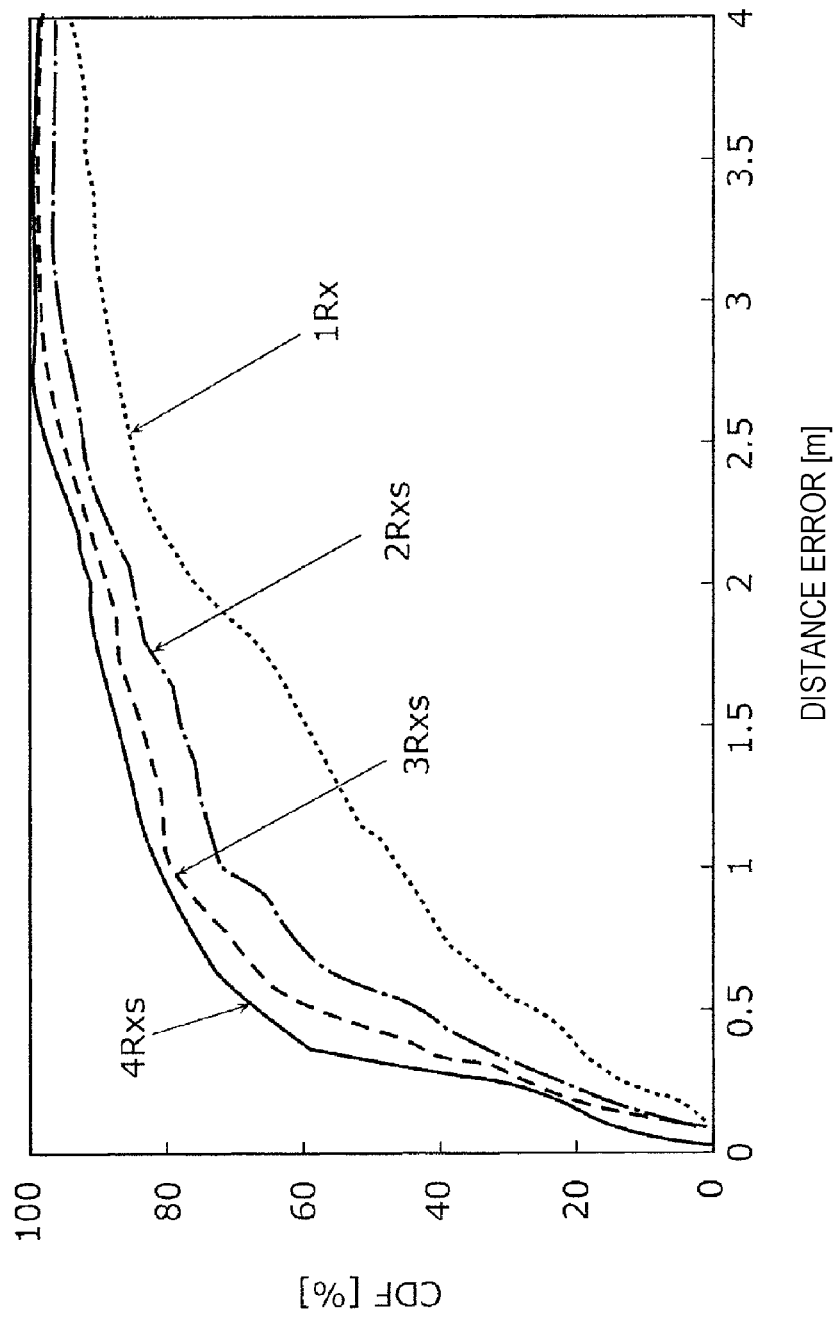
FIG. 11 is a diagram illustrating the cumulative distribution function of an estimated-position error according to the operative example of the second embodiment in a case of changing the number of receiving stations.

FIG. 11 is a diagram illustrating the cumulative distribution function (CDF) of the estimated-position error according to this operative example in a case of changing the number of receiving stations. The vertical axis represents the CDF, and the horizontal axis represents the estimated-position error. The graph indicated by 1Rx represents a result obtained by measuring the CDF of the estimated-position error at one station among the four receiving stations Rx1 to Rx4. Similarly, the graph indicated by 2Rxs, 3Rxs, or 4Rxs represents a result obtained by measuring the CDF of the estimated-position error at two, three, or four stations among the four receiving stations Rx1 to Rx4.

It is found from the results illustrated in FIG. 11 that the probability of successful position estimation with an estimated-position error of less than 1 m in a case of using two stations is higher than that in a case of using one station, the probability in a case of using three stations is higher than that in the case of using two stations, and the probability in a case of using four stations is higher than that in the case of using three stations.

According to the above-described results, it is found that the accuracy of position estimation is increased by increasing the number of receiving stations.

As described above, according to the present disclosure, living-body components are extracted from information about complex transfer functions obtained by the plurality of receiving stations, and position spectral functions obtained by calculations of the extracted living-body components are integrated to thereby estimate the position of a living body. Accordingly, it is possible to estimate, by using radio signals, the position at which a living body is present for a wider area without an influence of an obstacle. For example, even in a case where signals from a living body, which is a target, are weak and some of the plurality of receiving stations fail to observe reflected waves from the living body, it is possible to estimate the position of the living body by using position spectral functions calculated from complex transfer functions obtained by the receiving stations that have successfully observed reflected waves from the living body.

The sensors and the position estimation methods according to aspects of the present disclosure have been described with reference to the embodiments; however, the present disclosure is not limited to the embodiments. Various modifications conceived by a person skilled in the art for the embodiments and a form configured by combining constituent elements in different embodiments without departing from the spirit of the present disclosure are included in the scope of the present disclosure.

The present disclosure can be implemented not only as a sensor that includes the above-described specific constituent elements but also as, for example, a position estimation method that includes the specific constituent elements included in the sensor as steps. Further, the specific steps included in the method can be implemented as a computer program that is executed by a computer. The computer program can be distributed via a non-transitory computer-readable recording medium, such as a CD-ROM, or a communication network, such as the Internet, as a matter of course.

The present disclosure can be used for a sensor and a position estimation method for estimating the position of a living body using radio signals. Specifically, the present disclosure can be used for a sensor that is mounted in, for example, a measuring instrument for measuring the direction or position of a living body, a household electrical appliance that performs control in accordance with the direction or position of a living body, or a monitoring apparatus that detects an entering living body, and for a position estimation method that is used therein.

What is claimed is:

1. A sensor, comprising:
a first transmitting station that includes a transmission antenna;
a first receiving station that includes a first reception array antenna;
a second receiving station that includes a second reception array antenna;
a first circuit that extracts living-body components based on a signal observed by the first reception array antenna of the first receiving station and a signal observed by the second reception array antenna of the second receiving station, the living body components being signal components transmitted from the transmission antenna and reflected by at least one living body;
a second circuit being configured to
calculate, based on the living body components, a first position spectral function, which is an evaluation function with respect to a direction of the at least one living body viewed from the first receiving station, and
calculate, based on the living body components, a second position spectral function which is an evaluation function with respect to a direction of the at least one living body viewed from the second receiving station,
a third circuit being configured to
calculate an integrated position spectral function based on the first position spectral function and the second position spectral function, and
determine a position of the at least one living body based on the integrated position spectral function,
wherein a direction from the first transmitting station to the first receiving station is different from a direction from the first transmitting station to the second receiving station.

2. The sensor according to claim 1,
wherein the sensor includes two or more transmitting stations, and
the two or more transmitting stations each include a transmission array antenna constituted by the transmission antenna having two or more elements.

3. The sensor according to claim 2, further comprising:
a fourth circuit that controls a transmission timing such that none of the two or more transmitting stations simultaneously perform transmission via the transmission array antenna.

4. The sensor according to claim 1,
wherein the third circuit, which estimates the position of the at least one living body, multiplies the plurality of calculated position spectral functions by each other or adds the plurality of calculated position spectral functions together to integrate the plurality of calculated position spectral functions into one position spectral function.

5. The sensor according to claim 1,
wherein the second circuit, which calculates the plurality of position spectral functions, calculates the plurality of position spectral functions on the basis of a MUltiple SIgnal Classification (MUSIC) algorithm.

6. The sensor according to claim 1,
wherein in the determining the position of the at least one living body, the third circuit is configured to
specify at least one maximum value of the integrated position spectral function, and
determine a position, corresponding to the at least one maximum value, as the position of the at least one living body.

7. A method for estimating a position of a living body, the method comprising:
extracting, by first circuit, living-body components based on a signal observed by a first reception array antenna of a first receiving station and a signal observed by a second reception array antenna of a second receiving station, the living body components being signal components transmitted from a transmission antenna element of a transmitting station and reflected by at least one living body;

calculating, based on the living body components, a first position spectral function, which is an evaluation function with respect to a direction of the at least one living body viewed from the first receiving station;

calculating, based on the living body components, a second position spectral function, which is an evaluation function with respect to a direction of the at least one living body viewed from the second receiving station;

calculating an integrated position spectral function based on the first position spectral function and the second position spectral function; and determining a position of the at least one living body based on the integrated position spectral function, wherein a direction from the first transmitting station to the first receiving station is different from a direction from the first transmitting station to the second receiving station.

8. The method according to claim 7, wherein in the determining the position of the at least one living body specifying at least one maximum value of the integrated position spectral function, and determining a position, corresponding to the at least one maximum value, as the position of the at least one living body.

\* \* \* \* \*